United States Patent [19]
Ugon

[11] Patent Number: 5,944,833
[45] Date of Patent: Aug. 31, 1999

[54] INTEGRATED CIRCUIT AND METHOD FOR DECORRELATING AN INSTRUCTION SEQUENCE OF A PROGRAM

[75] Inventor: Michel Ugon, Maurepas, France

[73] Assignee: CP8 Transac, Louveciennes, France

[21] Appl. No.: 08/945,845

[22] PCT Filed: Mar. 7, 1997

[86] PCT No.: PCT/FR97/00406

§ 371 Date: Nov. 7, 1997

§ 102(e) Date: Nov. 7, 1997

[87] PCT Pub. No.: WO97/33217

PCT Pub. Date: Sep. 12, 1997

[30] Foreign Application Priority Data

Mar. 7, 1996 [FR] France .................................. 96-02903

[51] Int. Cl.⁶ ........................................................ G06F 9/06
[52] U.S. Cl. ................................................ 713/400; 712/220
[58] Field of Search ..................................... 395/551, 384, 395/392, 569; 713/400; 712/208, 216, 220, 228, 226

[56] References Cited

U.S. PATENT DOCUMENTS 4,125,763  11/1978  Drabing et al. .
4,827,111  5/1989  Kondo ..................................... 235/380
5,249,294  9/1993  Griffin, III et al. ..................... 395/186
5,404,402  4/1995  Sprunk .

FOREIGN PATENT DOCUMENTS 0448262  9/1991  European Pat. Off. .
2596897  10/1987  France .

OTHER PUBLICATIONS

IBM Technical Disclosure Bulletin, vol. 37, No. 5, May 1, 1994, pp. 419–421, XP000453206 "Actively Slowing a CPU in Response to the Detection of a Signature String".
Patent Abstracts of Japan, vol. 016, No. 532 (P–1448) Oct. 30, 1992 & JP 04 199234 A (Nagano Oki Denki KK; Others: 01) Jul. 20, 1992.

Primary Examiner—Thomas M. Heckler
Attorney, Agent, or Firm—Kerkam, Stowell, Kondracki & Clarke, P.C.; Edward J. Kondracki

[57] ABSTRACT

The present invention relates to an improved integrated circuit for a microprocessor controlled by at least one program and the process for using the circuit which includes means which can decorrelate the running of at least one instruction sequence of a program from internal or external electrical signals of the integrated circuit. The internal or external electrical signals include timing, synchronization and status signals.

26 Claims, 6 Drawing Sheets

INTEGRATED CIRCUIT AND METHOD FOR DECORRELATING AN INSTRUCTION SEQUENCE OF A PROGRAM

BACKGROUND OF THE INVENTION

1. Field of the Invention

The present invention relates to an improved integrated circuit and the process for using it. The invention is particularly applicable to microprocessors and microcomputers and also to hardwired logic circuits which require protection.

2. Description of Related Art

It is known that microprocessors and microcomputers sequentially execute successive instructions of a program stored in a memory, in sync with one or more timing signals referenced relative to one of the clock signals supplied to the microprocessor or microcomputer either internally or externally.

Thus, it is possible to correlate the various phases of this program execution with the clock signals, since the execution of each particular instruction breaks down into several steps timed by one or more successive clock pulses. In effect, in the microprocessors of the prior art, the operation is regularly timed by clock signals generally originating from a sequencing circuit which generates the necessary electrical pulses, particularly by phase shifting the signals relative to the reference clock. Moreover, the sequencing of the actions must factor in the times required to access the various registers, memories and internal devices, but also and especially the signal propagation times in the busses and through the various logic circuits. Consequently, the start and end times of each instruction being perfectly known, it is theoretically possible to know which instruction is being executed in the processing unit of the processor at a given moment, since the program that is running is constituted by a predetermined sequence of instructions.

It is possible, for example, to determine the number of clock pulses delivered since the startup of the program or the resetting of the processing unit, or even the time that has elapsed since an event or an external or internal reference signal.

This capability of being able to observe the running of a program in a microprocessor or a microcomputer is a major drawback when the microprocessor or microcomputer is used in high-security applications. In effect, an ill-intentioned individual would thus be able to know the successive states of the processor and use this information to gain knowledge of certain internal output data.

It is possible to imagine, for example, that a given action on an external signal could take place at different instants as a function of the result of a determined security operation, such as the testing of confidential internal information or the decryption of a message, or even the integrity checking of certain information. Depending on the instant in question, this external signal could supply information on the output data or on the confidential content of the information, and in the case of cryptographic calculations, on the secret encryption key used.

Moreover, there are known microprocessors or microcomputers, such as those marketed by the company SGS Thomson under the reference number ST16XY, which comprise a microprocessor incorporating a random number generator, the reading of which makes it possible to obtain a random number used, for example, for the calculation of encryptions and decryptions.

SUMMARY OF THE INVENTION

One of the objects of the invention is to equip the circuit with means for preventing the type of investigation described above, and more generally for preventing observations, whether illicit or not, of the internal behavior of the circuit.

This object is achieved through the fact that the improved integrated circuit has means for decorrelating the running of at least one instruction sequence of a program from the internal or external signals of the circuit.

According to another characteristic, the electrical signals of the circuit are timing, synchronization or status signals.

According to another characteristic, the decorrelation means comprise one or more circuits generating a sequence of clock or timing pulses which are dispatched at random times.

According to another characteristic, the decorrelation means comprise a random number generator which makes it possible to de-synchronize the execution of the program sequence in the processor.

According to another characteristic, the decorrelation means comprise a clock calibration circuit which makes it possible to eliminate the timing pulses that are too short.

According to another characteristic, the decorrelation means comprise a random interrupt generating system.

According to another characteristic, the decorrelation means comprise the execution of secondary sequences in which the instructions and execution times are different and which are selected at random.

According to another characteristic, the variable time of the secondary process depends on a value supplied by a random number generator.

According to another characteristic, the secondary process does not modify the general operational context of the main program, thus making it possible to return to the latter without having to re-establish this context.

According to another characteristic, the secondary process re-establishes the context of the main program before returning the control of the processor to it.

According to another characteristic, the main program can enable or disable one or more decorrelation means.

According to another characteristic, it has means for phase shifting the timing, synchronization or status signals of the processor.

According to another characteristic, the phase shifting means generate a random phase shift of the timing, synchronization or status signals of the processor.

According to another characteristic, the random phase shifting means partially or completely de-synchronize the operation of the processor from the external clock during the execution of a program.

According to another characteristic, the random number generator uses counters, which may or may not be looped, and which are initialized to a random value.

According to another characteristic, the initialization value originates from a non-volatile memory.

According to another characteristic, the initialization value is modified during the execution of a program.

According to another characteristic, the random number generator uses an algorithm of the cryptographic type or a hash function initialized to the initialization value.

According to another characteristic, the sequencing of the actions factors in the times required to access the various registers, memories and internal devices, but also and especially the signal propagation times in the busses and through the various logic circuits.

Another object of the invention is to offer a process for using the integrated circuit.

This object is achieved by the fact that the process for using an integrated circuit is comprised:

of triggering the sequencing of one or more instructions or operations using a random-pulse clock;

or of randomly triggering interrupt sequences;

or of triggering the processing of a random sequence of instructions or operations during the execution of a main sequence of instructions or operations;

or of combining at least two of the above-mentioned possibilities.

BRIEF DESCRIPTION OF THE DRAWINGS

Other characteristics and advantages of the present invention will become more clearly apparent with the reading of the following description, given in reference to the appended drawings in which.

DESCRIPTION OF THE PREFERRED EMBODIMENT(S)

Figure 1:
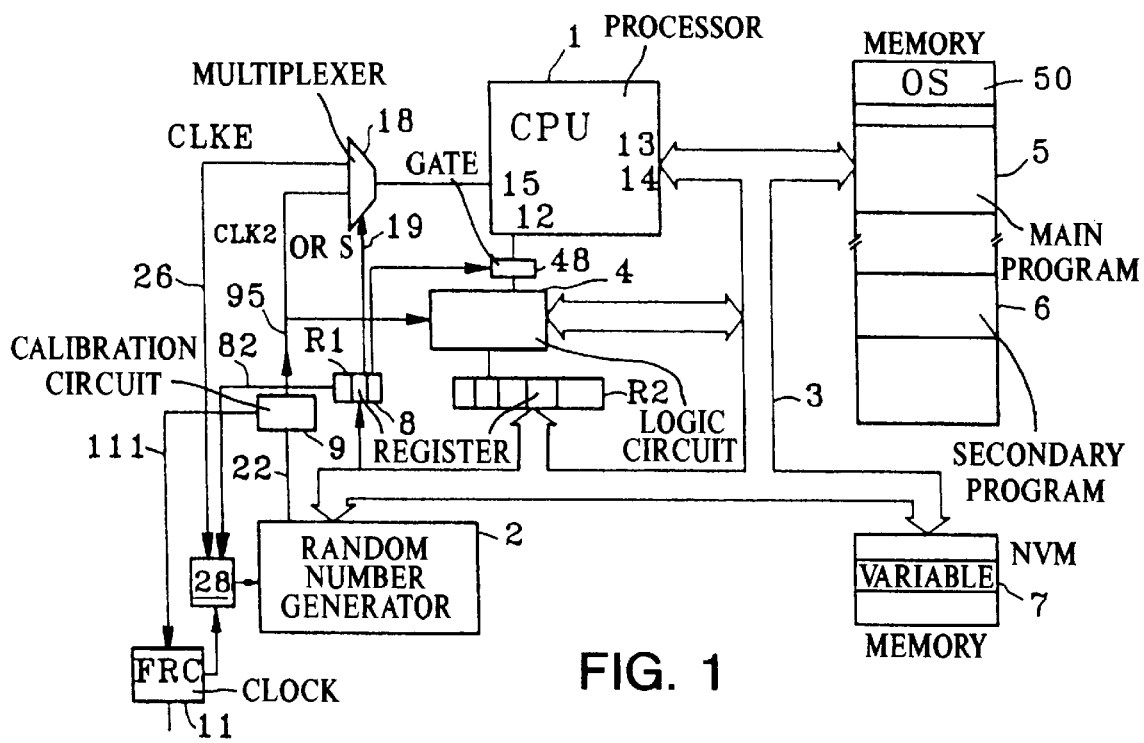
FIG. 1 represents the schematic diagram of the electronic circuits of a first embodiment of the invention.

In the following description, the term microcomputer is intended to mean a monolithic integrated circuit incorporating a microprocessor with a read-write memory of the RAM type associated with at least one non-volatile memory which may or may not be programmable such as, for example, a RAM with battery backup, or a ROM, or PROM, or EPROM, or EEPROM, or RAM of the Flash type, etc . . . or a combination of these memories.

The invention will now be explained with the aid of FIG. 1 in which a CPU (1) comprises a random number generator (2) which can run on an internal clock (11). Processors of this type, as mentioned above, are particularly known through the ST16XY family of microcomputers. However, these microcomputers or microprocessors, which use a shift register with parallel input-outputs looped back to at least one of its inputs, wherein the shift is timed by an internal clock, to constitute the random number generator, use the external clock for sequencing the machine cycles of the microprocessor to execute the instruction to read the contents of the register. The invention makes it possible to generate a random number that is not pseudo-random and is based on the fact that the internal clock of the random number generator, which has a multiple frequency from the external clock, is randomly phase shifted relative to the latter.

The invention is comprised of using the principle of a microprocessor of this type with a random number generator, adding to it a certain number of elements which will allow the microprocessor running the main program to go from an operation that is perfectly in phase and correlated to the external sequencing clock, to a decorrelated operation in which, as desired and depending on the embodiment chosen, the execution time of a given instruction will no longer be identical, even when the same instruction is executed several times, or in which the execution duration of an instruction sequence will be variable even if the same sequence is re-executed several times by the main program, or even in which the execution duration of an instruction will be variable, the execution time of the same instruction itself being variable. This is obtained by the circuit in FIG. 1 in which, in addition to the random number generator (2), the internal clock (11) is embodied by a free fixed frequency oscillator, de-synchronized and phase shifted relative to the external clock CLKE of the microprocessor or microcomputer. In the prior art, one skilled in the art would not have considered timing the operation of a microcomputer or a microprocessor with an irregular clock. On the contrary, everything was done to ensure that the operation was regularly timed by clock signals generally originating from a sequencing circuit which generated the necessary electrical pulses, particularly by phase shifting the signals relative to the reference clock. This was particularly due to the fact that the sequencing of the actions must factor in the times required to access the various registers, memories and internal devices, but also and especially the signal propagation times in the busses and through the various logic circuits. In the invention, the random number generator (2) is used either to supply a random value to the various devices through the data bus (3) and load it into the various devices which will be described below, or to generate a pulse signal of variable periodicity at its output (22). In a microprocessor or microcomputer of the invention, the signals required for the loading and execution of the instructions can therefore be generated from randomly dispatched clock pulses, but these pulses must adhere to a minimum cycle time so that the processor (1) has enough time to execute the various operations. This signal, in order to serve as a clock for the microprocessor (1), must be sent to a calibration circuit (9). The output (95) of this calibration circuit is sent to a multiplexing circuit (18) whose input (19) for controlling the multiplexing receives the signal of one or more bits of a register (8) which can be loaded either by the random number generator (2) or with a value determined by the main program (5). When this register (8) is loaded with a random value, the decision which selects the clock signal sent to the processor is made randomly, whereas when this register (8) is loaded with a value determined by the main program, it is the main program which will choose whether the clock for sequencing the microprocessor will be the external clock CLKE or a decorrelation clock CLK2. Likewise, one or more bits of the register (8) are sent through the link (82) to a logic circuit (28) which makes it possible, as a function of the bit or bits of the register (8), to validate or not to validate the transmission of the internal clock signal (11) to the random number generator (2). This random number generator can then also run on the external clock CLKE by receiving its signal through the link (26) and the logic circuit (28). In this latter case, the values generated will be pseudo-random values. The random number generator (2) can operate using the internal clock (11) validated through the circuit (28) by the bit or bits of the register (8), and in this case, the values generated will be random values. The signal I generated at the output (22) of the random number generator (2) and received by the calibration circuit (9) corresponds to a pulse signal whose periodicity varies, either randomly or in pseudo-random fashion. The fact that this periodicity varies in pseudo-random fashion is of little concern since, as will be seen below, the calibration circuit (9) introduces an internal clock signal (FRC) which will itself reintroduce a decorrelation, through a different frequency and a phase shift relative to the external clock signal CLKE, and consequently relative to the pseudo-random clock signal synchronized to this external clock signal.

The device can also comprise a register R2 which is loaded, either by the random number generator (2) with a random number, or by the main program (5) with a value determined by the program. This register R2 is totally or partially used by a logic circuit (4) for triggering an interrupt, which receives at one of its inputs the decorrelated clock signal CLK2 issuing from the output (95) of the calibration circuit (9). The output of the circuit (4) is sent through a gate (48) controlled by one or more bits of the register (8) to the interrupt input (12) of the CPU. The bit or bits of this register (8) play the role of an interrupt mask control, which is standard in certain microprocessors. When an interrupt is received at the interrupt input (12) of the processor, the interrupt handling program contained, for example, in the operating system or in the secondary program will introduce a different processing time for the interrupted sequence of the main program. It must be understood that there are two phases in the interrupt mode of operation.

A first phase, in which the microprocessor controlled by the so-called main program authorizes the decorrelated operation by unmasking, for example, the interrupts.

A second phase, in which the interrupt automatically reroutes the operation to the secondary program. This operation can actually occur without the intervention of the main program.

Figure 8:
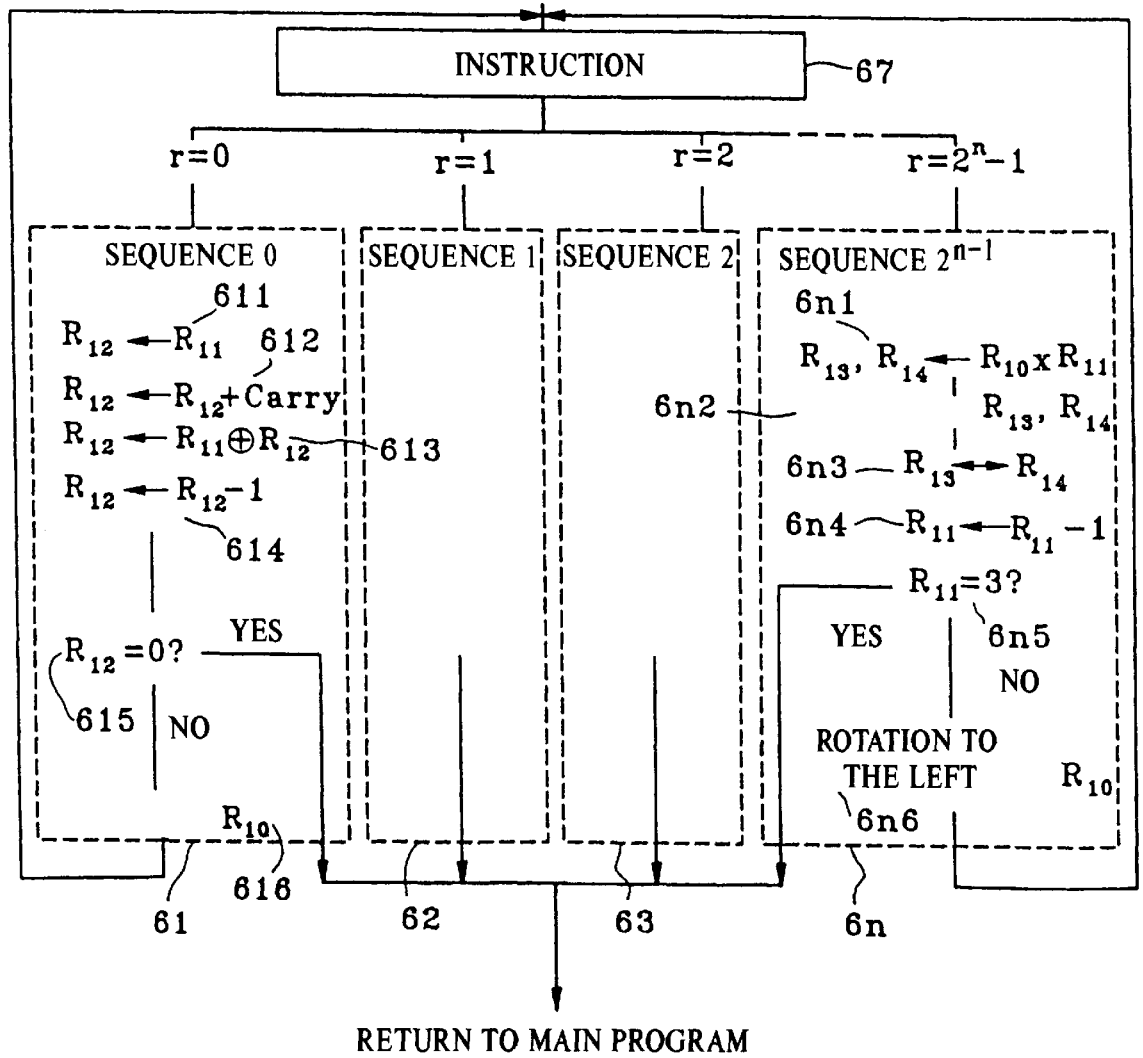
FIG. 8 schematically represents an example of randomly selected sequences of the secondary program.

Lastly, the device of the invention can also comprise a secondary program (6) which, as will be seen below, can generate a variable duration time which varies each time this secondary program (6) is called by the main program (5). Thus, the variant of embodiment represented in FIG. 1 allows the main program (5) to change the desired degrees of protection, either by triggering the sequencing of the execution of one or more instructions with the aid of the decorrelated clock CLK2, or by deciding during the execution of an instruction sequence to introduce, or not to introduce, a randomly triggered interrupt handler, or by deciding during the execution of the sequence to introduce, or not to introduce, a jump to the secondary program (6), which also generates a process with a variable time, or even by combining these various possibilities. Thus, in a variant of the invention, this secondary program (6) can be constituted as represented in FIG. 8 by a plurality of sequences (61, 62, 63 . . . 6n) which are called at random; and each sequence (0, 1, 2 or $2^{n-1}$) will implement a different set of instructions which will result in a variable processing time in each branch and different behaviors of the microprocessor. The sequences can be called at random; for example, after the main program has executed the jump to the secondary program, the latter loads, in the steps (64 and 65), a random value V originating from the memory (7) into two registers, for example R10 and R11, of the microprocessor (1). The secondary program increments this value V, then the program orders the storage of this incremented value (V+1) in the non-volatile memory NVM (7) in the step (66). This value stored in the non-volatile memory (7) is intended to be used later. The secondary program, in the step 67, then extracts n high-order or low-order bits in R10 in order to obtain a value r which will make it possible to indicate which program sequence among the secondary program sequences (61, 62, 63, . . . , 6n) is to be executed. Each secondary program sequence will produce a different process: for example, the sequence (0) is comprised, first of all, of the step 611 for transferring the content of the register R11 of the microprocessor into a register R12. In the step 612, the content of R12 is added to the carry value (CARRY), then in the step 613, an exclusive OR is executed between the content of the register R11 and the content of the register R12, and the result is placed in the register R12. In the step 614, the processor decrements R12; in the step 615, a test is carried out on the value of R12 to determine whether or not R12 is equal to zero. In the case where R12=0, the processor returns to the execution of the main program. In the opposite case, in the step 616, the secondary program (61) executes a rotation of the content of the register R10. The next step consists of extracting n bits of a determined order from the register R10, in order to then access one of the sequences determined by this value r in the secondary program. Thus, it is possible to access, for example, the sequence ($2^{n-1}$) which, in the step (6n1), is comprised of transferring the result of the multiplication of the values of R10 and R11 into R13 and R14. In the step (6n2), this sequence executes a rotation of R13 and R14, then, in the step (6n3), the content of R13 is transferred into R11. In the step (6n4), R11 is decremented in order to then, in the step (6n5), perform a test on the value R11. This test is comprised of determining whether or not the content of R11=3. If so, the process returns to the main program and if not, the program proceeds to the step (6n6) by rotating R10 to the left, then executing the instruction (67) in order to access a new secondary program sequence.

In the case where the secondary program is intended to be combined with a decorrelated clock or interrupt handlers, it is possible in a combination of this type to restrict oneself to one secondary program, thus producing a simpler process. A simplified secondary program of this type can be constituted by the following instructions:

MOV B, R2 which is comprised of loading the register R2 into the microprocessor register B LOOP DCX B which is comprised of decrementing the register B with the value A JNZ B LOOP which is comprised of performing a test on the value of the register B and of looping back to the label LOOP if this value is different from zero.

This sequence ends with an instruction to return to the instruction of the main program which immediately follows the last instruction executed before the jump to the secondary program (6). The register R2 is pre-loaded by an instruction of the main program (5), before the jump to the secondary program (6), with a random value supplied by the random number generator (2). Thus, the execution of the secondary program defined above will always generate a variable duration.

Another embodiment of a secondary program of variable duration can be comprised of defining an area of the program storage corresponding to the secondary program (6) in which a set of instructions is stored. Preferably, the instructions chosen require different numbers of machine cycles in order to be executed, as is known to be the case, for example, with the instructions J, CALL, RET, RST, PCHL, INX in relation to instructions requiring a number of shorter machine cycles such as ADC, SUB, ANA, MOV, etc. Thus, in this storage area, there are a certain number of available instructions having execution durations that are different from one another in terms of the number of machine cycles. The main program (5) comprises an instruction to jump to an indexed address whose index corresponds to the content of the register R2 and whose address corresponds to the first address of the area (6). The execution of this instruction of the main program (5) therefore causes the addressing by the processor (1), at random, of instructions whose execution durations will be different depending on the position addressed. In a known way, the random number generator (2) will be initialized at the start to a variable. This initial variable is contained in a non-volatile memory (7) and constituted, for example, by the last random value generated by the generator (2) before the pausing of the microprocessor (1). Thus, the microprocessor, controlled by a program it will execute, will be able to use this program to activate the means for decorrelating the instruction execution sequencing of this program by loading, for example, registers R2 or 8, or by calling secondary programs.

Figure 2:
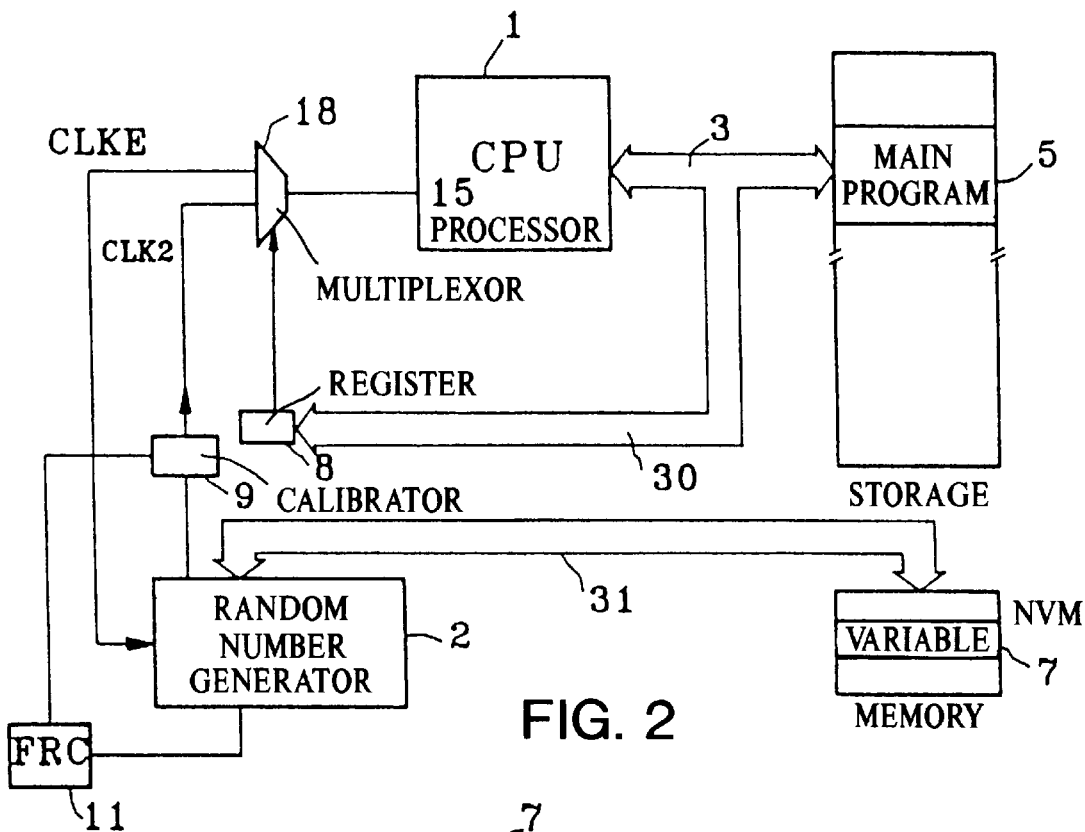
FIG. 2 represents a second, simplified variant of embodiment of the invention.

FIG. 2 represents another variant of a simplified embodiment of the invention, in which the content of the register (8) will command the multiplexer (18) to decide whether the external clock CLKE is sent to the processor (1) or whether simply the decorrelated clock CLK is used by the CPU (1). This register (8) is loaded by the bus (30) upon execution of an instruction of the main program (5) which is designed to decide at a given moment to trigger the protected mode by generating instruction execution sequences of variable duration. The random number generator (2) is in communication through a bus (31) with the non-volatile memory (7), which makes it possible, for example, to store the last value generated so that when there is a new connection of the monolithic circuit, the random number generator is re-initialized with a value different from the preceding initial value. This bus (31) may be controlled by the processor (1). In another variant, the writing into the memory (7) can be controlled by a hardwired logic unit.

Figure 4A:
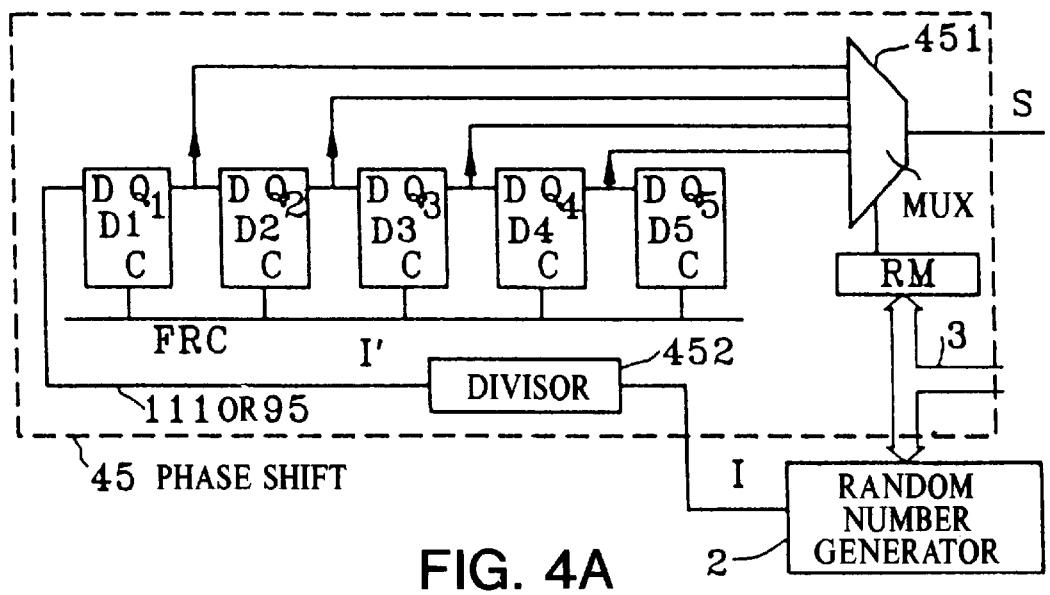
FIG. 4A represents the diagram of the logic circuits of an embodiment of a phase shifting circuit.
Figure 4B:
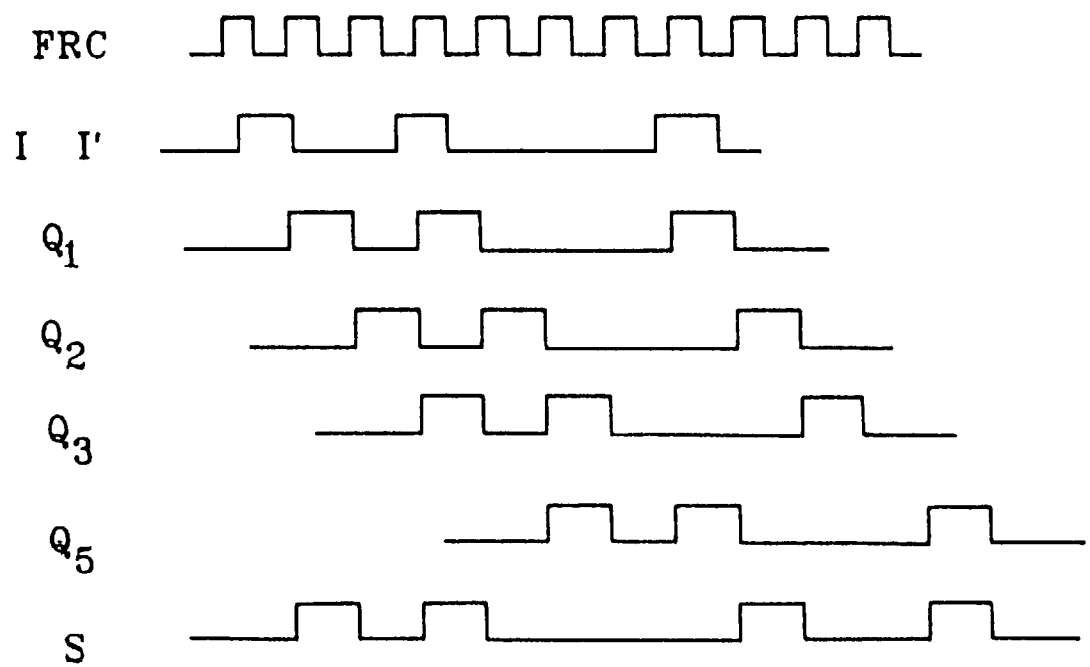
FIG. 4B represents the diagram of the sequences of the signals of this circuit.

In another embodiment, it is possible to introduce a variable phase shifting circuit (45) at the output of the clock circuit, as shown in FIG. 4A, which phase shifting circuit is constituted for example by a shift registers D1 through D5 timed by the signal FRC issuing from the clock circuit (11) or the recalibrated FRC supplied by the output (95) of the circuit (9) and phase shifting the signal I supplied by the output (22), which can be divided by a slowdown factor in a divisor (452). The output of the phase shifting circuit (45) can be produced with the aid of a multiplexer (451) MUX which makes it possible to extract any of the output signals Q1, Q2, . . . , Q5 from the shift register as a function of the content of the register RM which is loaded, either directly by the random number generator (2), or indirectly by the main program (5) or even by the secondary program (6), through the bus (3). In this case, the clock leading edges S delivered as output can be delayed or advanced relative to a median pulse supplied by the central level of the shift register, by a value which depends on a random number, thus proportionally delaying or advancing the instruction execution sequencing of the program in progress.

In another embodiment, the random number generator and the phase shifting circuit can be used continuously during certain particularly sensitive periods; during these phases, the processor is timed in a completely random fashion, since the time intervals which separate the clock pulses are variable, and not constant as is the case with the standard processors.

The organization of the programs executed by the processor can be carried out in such a way that the operation of the processor (1) is controlled by a genuinely protected operating system which chooses the type of scrambling to be used as a function of the type of program run by the machine. In this case, it is the operating system which manages, as it sees fit, the various signals resulting from the random number generator, the calibrator, the interrupts or commands from the phase shifting circuit, and the start up of the main and secondary programs. It is clear that the secondary program can be used to perform functions other than a simple time-out, particularly by executing processes which may be necessary to the main program in order to make use of the time dedicated to the secondary program, which processes can be constituted, for example, by preparations of calculations subsequently used by the main program. It is understood that the devices of the invention can easily be generalized when the processor is used in multiprogramming, the application programs in this case being considered to be a number of main programs. The random number generator and the clock phase shifting circuit seen above do not pose any particular production problem and are known to one skilled in the art when they are used separately for other usages not linked to the invention.

It is also possible to produce a fifth simplified embodiment of the invention which does not use an interrupt. When the main program needs to be protected, it independently activates a secondary program, which generates a process of random length at instants it selects, either at the start or during execution, so as to scramble the various sequences.

Figure 6:
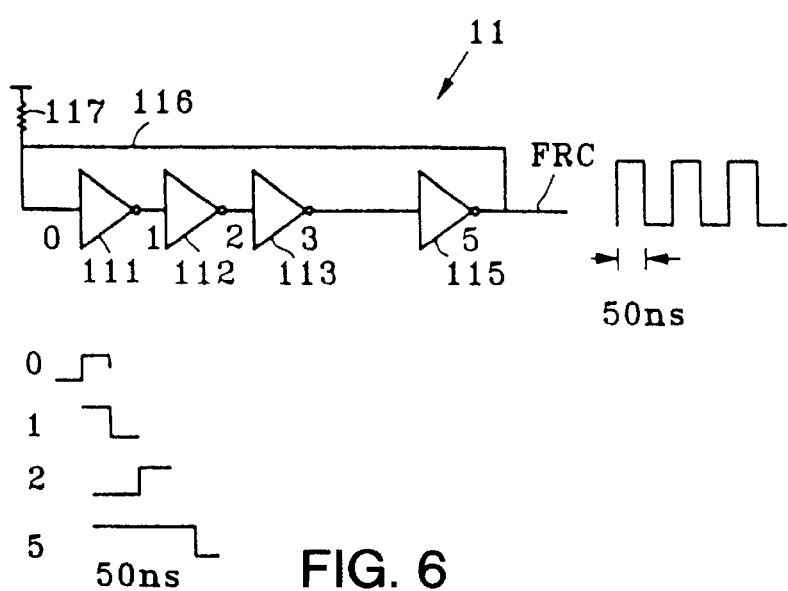
FIG. 6 represents the diagram of the logic circuits of an embodiment of an internal clock.
Figure 3A:
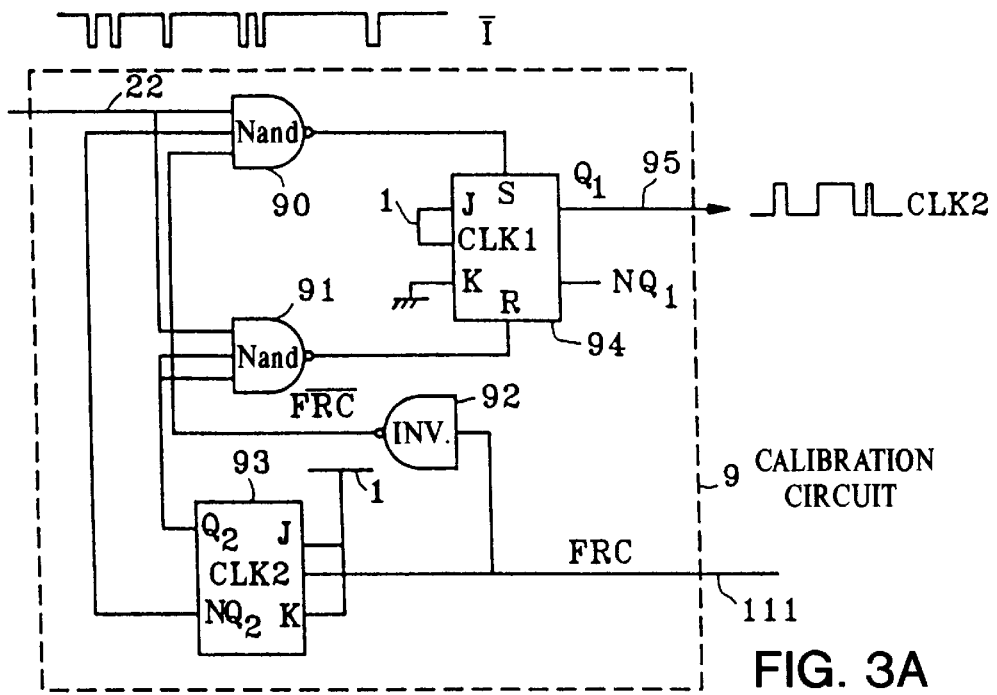
FIG. 3A represents the diagram of an embodiment of the calibration circuit.
Figure 3B:
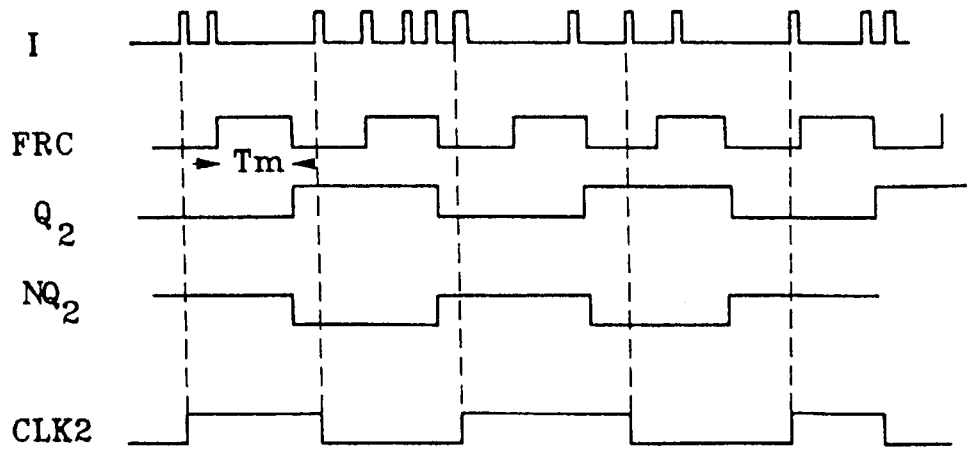
FIG. 3B represents the logical sequencing diagrams of the calibration circuit.
Figure 7A:
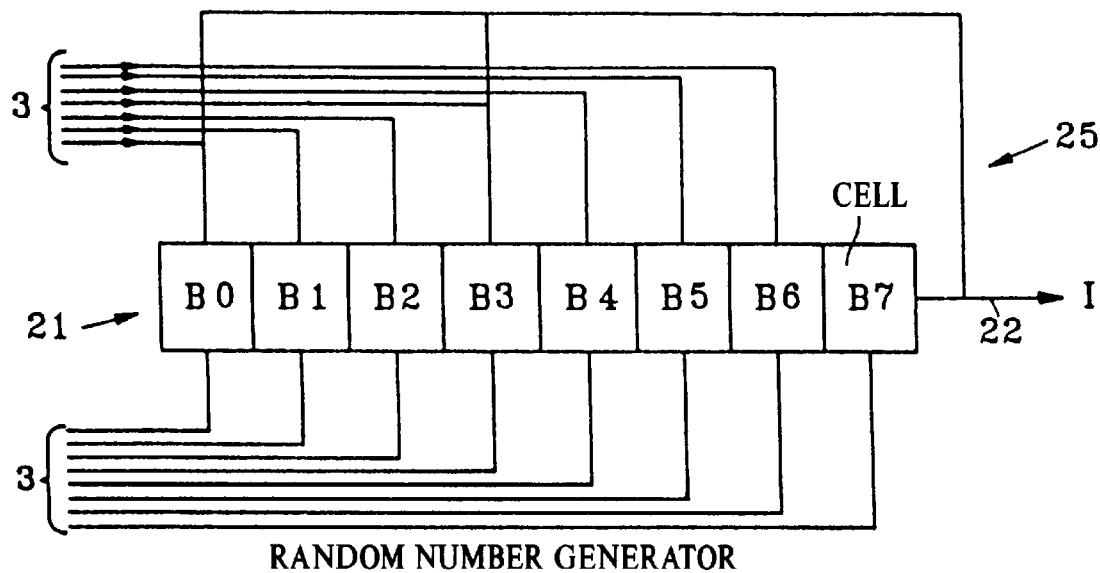
FIG. 7A represents the logic diagram of an embodiment of the random number generator.
Figure 7B:
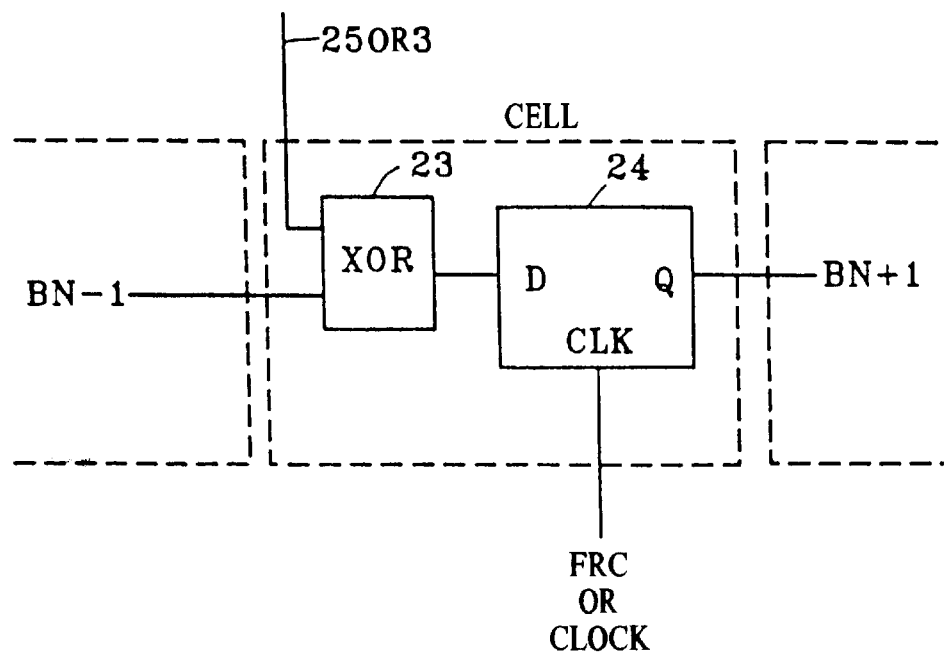
FIG. 7B represents the logic diagram of an embodiment of each cell of the random number generator.

The various circuits which allow the embodiment of the invention will now be described in connection with the other figures. Thus, a random number generator represented in FIGS. 7A and 7B is constituted, for example, by a set of cells (B0 through B7) each of which is formed by an exclusive OR gate (23) with two inputs connected to a type D switch (24) whose output (Q) is connected to one of the two inputs of the exclusive OR gate of the next cell. The second input of the exclusive OR gate receives the input signal of the data issuing from the bus (3) in order to allow the initial loading or, for the cells (B0) and (B3), for example, a loop-back signal (25) issuing from the last cell (B7). The output (22) of the last cell (B7) also constitutes the output which delivers the pulse signal (I) of randomly variable periodicity. This signal (I) is then used in the calibration circuit (9) represented in FIG. 3A. FIG. 3B represents the sequencing of the input and output signals of this calibration circuit (9) in FIG. 3A. This calibration circuit is constituted by two NAND gates (90, 91) with three inputs, each of which receives, at one input, the signal I issuing from the output (22) of the random number generator (2). A first NAND gate (91) receives the output (Q2) of a toggle of the JK type, while the other gate (90) receives the inverted output (NQ2) of this toggle (93). This toggle (93) receives at its clock input a clock signal FRC which constitutes an internal clock of the circuit. This internal clock is generated, for example, by a circuit represented in FIG. 6. The inputs J and K of this toggle (93) are connected to the supply voltage representing the logical level "1". The internal clock signal FRC is sent by an inverter circuit (92) to each of the three inputs of the NAND gates (90, 91). The output of the first NAND gate

(90) is sent to the input for setting the second logical toggle (94) to 1, while the output of the second NAND gate (91) is sent to the input for resetting the second toggle (94) to zero. The clock input and the input (J) of this second toggle (94) are connected to the supply voltage representing the level (1) and the input (K) is connected to the supply voltage representing the level zero. The output (Q1) of this second toggle (94) delivers the signal CLK2 supplied by the link (95) to the multiplexer (18). The internal clock FRC delivers, through the link (111), periodic pulse signals having a minimum pulse width Tm which is defined by the circuit in FIG. 6. This circuit (11) is constituted, for example, by a series of inverters (111 through 115), in this case five, which each have a determined propagation time, for example 10 nanoseconds, making it possible to obtain at the output FRC a pulse of 50 nanoseconds. This output FRC is looped back through the link (116) to the input of the first inverter (111), and the input of the first inverter (111) is also fed through a resister (117) by the 5-volt supply voltage. The pulse width selected is 50 nanoseconds, but it is quite obvious that varying the number of inverter gates varies the value $T_m$. This value $T_m$ will be used, as represented in FIG. 3B, by the logic circuit (9) of FIG. 3A to generate, from the pulse signal of randomly variable periodicity (I), a pulse signal CLK2 whose pulses of variable width have a minimum value $T_m$ and whose periodicity is also variable and de-synchronized relative to the external clock CLKE. In effect, since the internal clock begins to function as soon as the integrated circuit is powered up, if the initial periodicity of this clock is different from the periodicity of the external clock, there is no chance for the clocks to be synchronized at the startup. The signals from this calibrator (9) have a period at least equal to twice the minimum time $T_m$ required for the processor to execute an internal cycle. All the leading edges of the signal CLK2 will be separated by at least the value $T_m$, but their position and their exact duration will be random.

It may also be seen that no matter what the variant of embodiment, the running of the main program occurs with an unpredictable sequencing which, depending on the variant, depends on the random number generator, on the random clock, on the secondary program, on the random interrupts, or on a combination of at least two of these devices. When the main program executes functions that are not sensitive from the point of view of security, it can also return to the external clock CLKE, for example in order to deliver output data to the external world or to mask the decorrelation interrupt in order to optimize the processing time. As soon as a security function is implemented, the main program (5) authorizes the random mode of operation by validating either the random clock or the decorrelation interrupt (or both) in order to "scramble" the various operational signals, particularly by de-synchronizing the clock relative to the main program, or by calling the secondary program.

Figure 5:
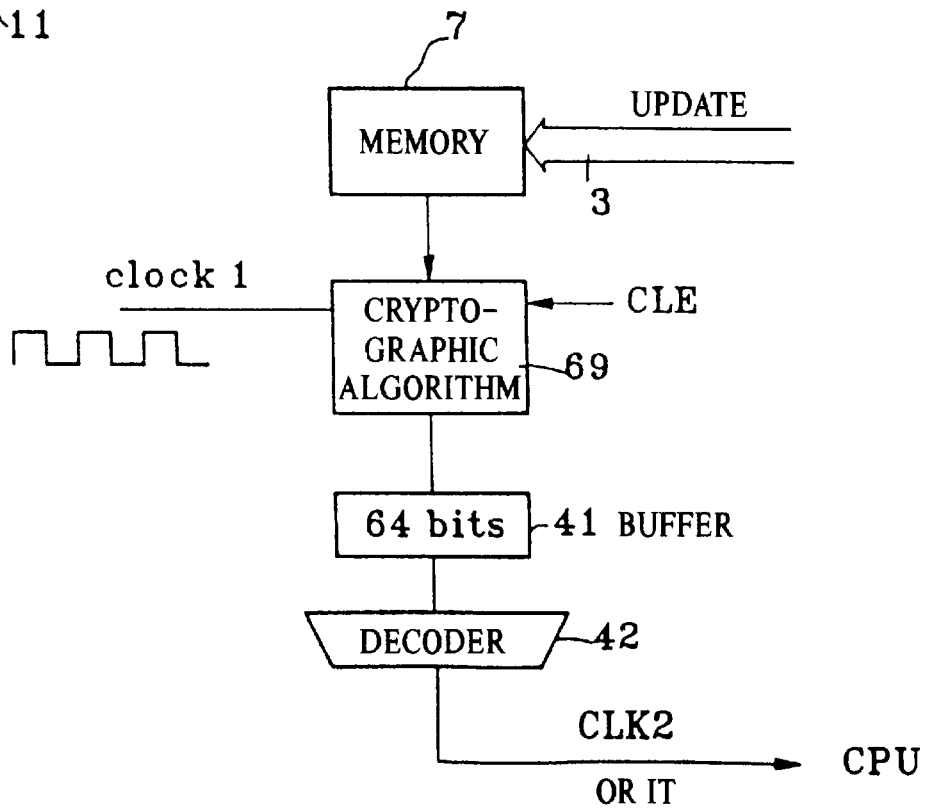
FIG. 5 represents a third variant of embodiment of the invention.

For the random number generator (2), it is possible, for example, to use looped counters having different periods, which counters are initialized with a "seed" (information) stored in a non-volatile memory (7). When the processor starts up, the counters factor in the stored value as the initial value. During the calculation, or at the end of the calculation, the non-volatile memory (7) is updated with a new value which will serve as a seed for initializing the counters at the next initialization. The interrupt generating circuit (4) can be designed so that the generation of interrupt pulses seen above can occur, for example, when the number generated has certain characteristics, such as equality with certain data of the program. This circuit (4) can also take on the value of one or more bits of one or more counters. It is also possible to produce a very good random number generator using a cryptographic algorithm (69), as shown in FIG. 5 or a hash function initialized by the "seeds" (information) seen above. In this case, the generator can be in the form of a program which implements the algorithm executed by the processor (1) and which, for example, implements the cryptographic algorithm by receiving a variable stored in the non-volatile memory (7) and a key for generating an output stored in a buffer register (41). This output stored in the buffer register is then processed by a hardware or software decoding device (42) for generating either the decorrelated clock signal (IT) CLK2 or a signal for interrupting the processor (1). It is easy to see that this random number generator can also be used to generate the various random numbers seen above. Another way to produce a generator of this type is to amplify the voltage generated at the terminals of a so-called "noise" diode and to shape the signals after a low pass filtering for preventing the noise pulses that are too rapid from disturbing the operation.

For the clock phase shifting circuit, there are possibilities other than the one seen above. For example, a shift register driven by a clock 10 times faster than that of the processor. If the register is assumed to comprise ten toggles, there will be ten available pulses having different phases, which can be selected by the processor with the aid of a multiplexer with ten inputs and one output, the output of the multiplexer, as before, is used to provide the internal clock signal of the processor.

Another embodiment is comprised of using a circuit of the same type as the random number generator seen above, and of extracting pulses at the different levels of the counters. In this case, the processor is actually timed by pulses that are dispatched at random times.

Another embodiment is comprised of using the signals from the random number generator to extract the pulses from the shift register. Many combinations are possible for refining the devices, but the principles of the invention remain valid.

The variant of embodiment in FIG. 1 is the most complete; quite obviously, the monolithic circuit of the microprocessor type or the microcomputer type could incorporate only one, or several, or any combination, of the elements represented.

Thus, according to a variant, the monolithic circuit can incorporate a microprocessor, the random number generator, the internal clock (FRC) and the calibration circuit which forms the decorrelated clock.

In another variant, the monolithic circuit can incorporate the microprocessor, the random number generator, and the interrupt generating circuit.

In another variant, the monolithic circuit can incorporate the microprocessor, the secondary program and the decorrelated and calibrated clock circuits.

In another variant, the monolithic circuit can incorporate a microprocessor, the decorrelated and calibrated clock circuit, and the interrupt circuit.

In other variants of the monolithic circuit, the microprocessor is replaced by a microcomputer.

In other variants of the monolithic integrated circuit, the microprocessor can be replaced by a combinational logic element which makes it possible to execute a limited number of instructions for specific applications. It is obvious that in such a case, the same security devices can be applied to the integrated circuit.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

I claim:

1. A process including a main program having interrupt sequences arranged to execute at least one operation and at least one instruction sequence in a microprocessor in synchronization with internal or external electrical signals of an integrated circuit comprising means for decorrelating an execution of the at least one instruction sequence of the program from the internal or external electrical signals of the integrated circuit so that the execution of the at least one instruction sequence is desynchronized with respect to the internal or external electrical signals, characterized in that the process comprises at least one of the following steps:
   a) triggering the sequencing of one of at least one instruction or at least one operation with the aid of a random-pulse clock;
   b) randomly triggering the interrupt sequences;
   c) triggering the processing of a random sequence of instructions or operations during the execution of a main sequence of instructions or operations;
   d) combining at least two of steps a, b and c.

2. An integrated circuit comprising a microprocessor controlled by at least one program including at least one program interrupt, the at least one program being arranged to execute at least one instruction sequence in the microprocessor in synchronization with internal or external electrical signals of the integrated circuit and means for decorrelating execution of the at least one instruction sequence of the program from the internal or external electrical signals of the integrated circuit so that the execution of the at least one instruction sequence is desynchronized with respect to the internal or external electrical signals and the program having an instruction sequence for authorization, modification, or disablement of the decorrelation means, wherein authorization includes unmasking the program interrupts.

3. An integrated circuit according to claim 2, characterized in that the decorrelation means comprises means for generating one of a timing signal, and a sequence of clock pulses which is dispatched at random times, and used to sequence one of means for randomly generating interrupts and means for triggering the execution of a secondary sequence.

4. An improved integrated circuit comprising a microprocessor having a main program arranged to execute at least one instruction sequence in the microprocessor in synchronization with internal or external electrical signals of the integrated circuit and means for decorrelating an execution of the at least one instruction sequence of the main program from the internal or external electrical signals of the integrated circuit so that the execution of the at least one instruction sequence is desynchronized with respect to the internal or external electrical signals.

5. The integrated circuit according to claim 4, characterized in that the decorrelation means comprises at least one circuit for generating a sequence of timing pulses which are dispatched at random times to the microprocessor by generation of a random number.

6. The integrated circuit according to claim 4, characterized in that the decorrelation means comprises a random interrupt generating system.

7. The integrated circuit according to claim 4, characterized in that said integrated circuit includes logic circuits and connecting busses connected such that sequencing of operations of the microprocessor factors in times required to access logic circuits of the integrated circuit, including signal propagation times in the busses and through the logic circuits.

8. The integrated circuit according to claim 4, characterized in that the decorrelation means comprises means for execution of a secondary program, the secondary program including a random choice of one of a plurality of sequences, the plurality of sequences including sequences each having a different set of instructions and a different execution time than all other ones of the plurality of sequences.

9. The integrated circuit according to claim 8, characterized in that the secondary program sequence generates a variable duration, wherein the variable duration depends on a value supplied by a random number generator.

10. The integrated circuit according to claim 8, characterized in that the secondary program sequence does not modify a general operational context of the main program, thus making it possible to return to the main program without having to re-establish the general operational context, wherein the general operational context includes at least a next instruction following a last instruction executed.

11. The integrated circuit according to claim 10, characterized in that the secondary program sequence re-establishes the general operational context of the main program before returning the control of the microprocessor to the main program.

12. The integrated circuit according to claim 4, characterized in that the main program can enable or disable the decorrelation means.

13. The integrated circuit according to claim 12, characterized in that the decorrelation means comprises at least one circuit for generating a sequence of timing pulses which are dispatched at random times to the microprocessor by generation of a random number.

14. The integrated circuit according to claim 12, characterized in that the decorrelation means comprises a random number generator for de-synchronizing execution of the at least one instruction sequence in the microprocessor.

15. The integrated circuit according to claim 12, characterized in that the decorrelation means comprises a random interrupt generating system.

16. The integrated circuit according to claim 12, characterized in that the decorrelation means comprises means for execution of a secondary program, the secondary program including a random choice of one of a plurality of sequences, the plurality of sequences including sequences each having a different set of instructions and a different execution time than all other ones of the plurality of sequences.

17. The integrated circuit according to claim 4, characterized in that the decorrelation means comprises a random number generator for de-synchronizing execution of the at least one instruction sequence in the microprocessor.

18. The integrated circuit according to claim 17, characterized in that the decorrelation means comprises a clock calibration circuit for eliminating timing pulses that are below a predetermined length.

19. The integrated circuit according to claim 17, wherein the random number generator includes counters which may or may not be looped, and which are initialized to a random value.

20. The integrated circuit according to claim 19, characterized in that the random number generator uses an algorithm of the cryptographic type or a hash function initialized to the initialization random value.

21. The integrated circuit according to claim 19, characterized in that the initialization value for the counters originates from a non-volatile memory.

22. The integrated circuit according to claim 21, characterized in that the initialization value for the counters is modified during the execution of a program.

23. The integrated circuit according to claim 4, characterized in that the electrical signals are timing, synchronization and status signals.

24. The integrated circuit according to claim 23, further includes means for phase shifting the timing, synchronization or status signals of the processor.

25. The integrated circuit according to claim 24, characterized in that the phase shifting means generates a random phase shift of the timing, synchronization or status signals of the processor.

26. The integrated circuit according to claim 25, characterized in that the phase shifting means is connected to an external clock for partially or totally de-synchronizing the operation of the processor from the external clock during the execution of a program.

* * * * *